United States Patent
Forlenza et al.

(10) Patent No.: US 9,563,876 B2
(45) Date of Patent: Feb. 7, 2017

(54) CONTROL OPTIONS FOR INSTANT MESSAGE DISPLAY AND NOTIFICATION

(75) Inventors: Randolph M. Forlenza, Austin, TX (US); John P. Kaemmerer, Pflugerville, TX (US); Raghuraman Kalyanaraman, Austin, TX (US); Courtney J. Spooner, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 2318 days.

(21) Appl. No.: 11/257,453

(22) Filed: Oct. 24, 2005

(65) Prior Publication Data

US 2007/0094360 A1 Apr. 26, 2007

(51) Int. Cl.
*G06F 15/16* (2006.01)
*G06Q 10/10* (2012.01)
*H04L 12/18* (2006.01)
*H04L 12/58* (2006.01)

(52) U.S. Cl.
CPC ......... *G06Q 10/107* (2013.01); *H04L 12/1813* (2013.01); *H04L 12/581* (2013.01); *H04L 51/04* (2013.01)

(58) Field of Classification Search
CPC .... H04L 12/581; H04L 12/587; H04L 67/306; H04M 3/537
See application file for complete search history.

(56) References Cited

U.S. PATENT DOCUMENTS

| | | | |
|---|---|---|---|
| 5,821,936 A | 10/1998 | Schaffer et al. | |
| 5,963,207 A | 10/1999 | Brewer et al. | |
| 5,977,973 A | 11/1999 | Sobeski et al. | |
| 6,069,628 A | 5/2000 | Farry et al. | |
| 6,118,428 A | 9/2000 | Blackmon et al. | |
| 6,301,609 B1 | 10/2001 | Aravamudun et al. | |
| 6,459,892 B2 * | 10/2002 | Burgan et al. | 455/412.1 |
| 6,661,435 B2 | 12/2003 | Nason et al. | |
| 6,785,708 B1 | 8/2004 | Busey et al. | |
| 6,907,447 B1 * | 6/2005 | Cooperman et al. | 709/203 |
| 6,981,223 B2 | 12/2005 | Becker et al. | |
| 7,333,976 B1 | 2/2008 | Auerbach et al. | |
| 7,421,661 B1 | 9/2008 | Canfield et al. | |
| 7,617,283 B2 | 11/2009 | Aaron et al. | |
| 7,761,507 B2 * | 7/2010 | Herf et al. | 709/204 |
| 7,844,673 B2 | 11/2010 | Bostick et al. | |
| 2001/0006382 A1 | 7/2001 | Sevat | |

(Continued)

OTHER PUBLICATIONS

Ed Bott "Special Edition Using Microsoft Windows Millennium Edition", year 2001, Chapter 29, pp. 1-25.*

(Continued)

*Primary Examiner* — Karen Tang
(74) *Attorney, Agent, or Firm* — Yee & Associates, P.C.; Lisa J. Ulrich (57) ABSTRACT

An instant messaging program is configured by receiving a chat selection input signal from the input device indicating the selection of a chat session; displaying selectable chat configuration parameters on the display; receiving a configuration input signal from the selection device indicating the selection of a chat configuration parameter; and linking the selected chat configuration parameter to the selected chat session so that the selected chat configuration parameter controls the subsequent display of the selected chat session.

5 Claims, 5 Drawing Sheets

(56) References Cited

U.S. PATENT DOCUMENTS

| | | |
|---|---|---|
| 2002/0035605 A1 | 3/2002 | McDowell et al. |
| 2002/0054141 A1 | 5/2002 | Yen et al. |
| 2002/0080184 A1 | 6/2002 | Wishoff |
| 2002/0130904 A1 | 9/2002 | Becker et al. |
| 2003/0088623 A1 | 5/2003 | Kusuda |
| 2003/0134678 A1 | 7/2003 | Tanaka |
| 2003/0228909 A1* | 12/2003 | Tanaka et al. ............ 463/42 |
| 2003/0236835 A1* | 12/2003 | Levi et al. ............ 709/204 |
| 2004/0056893 A1* | 3/2004 | Canfield et al. ............ 345/753 |
| 2004/0148346 A1* | 7/2004 | Weaver et al. ............ 709/204 |
| 2004/0203656 A1* | 10/2004 | Andrew et al. ............ 455/414.1 |
| 2004/0254998 A1 | 12/2004 | Horvitz |
| 2004/0267701 A1 | 12/2004 | Horvitz et al. |
| 2005/0086586 A1 | 4/2005 | Kim |
| 2005/0149606 A1 | 7/2005 | Lyle et al. |
| 2006/0009243 A1* | 1/2006 | Dahan et al. ............ 455/466 |
| 2006/0036703 A1* | 2/2006 | Fulmer et al. ............ 709/207 |
| 2006/0089978 A1* | 4/2006 | Lee et al. ............ 709/219 |
| 2006/0107231 A1* | 5/2006 | Matthews et al. ............ 715/788 |
| 2006/0140361 A1* | 6/2006 | Heikes et al. ............ 379/88.22 |
| 2007/0033254 A1* | 2/2007 | AlHusseini et al. ............ 709/205 |
| 2007/0094341 A1* | 4/2007 | Bostick et al. ............ 709/207 |
| 2007/0094342 A1 | 4/2007 | Bostick et al. |
| 2008/0178096 A1 | 7/2008 | Kusuda |
| 2008/0184170 A1 | 7/2008 | Periyalwar |
| 2009/0099992 A1* | 4/2009 | Horvitz ............ 706/46 |
| 2013/0066997 A1* | 3/2013 | Fish ............ 709/206 |

OTHER PUBLICATIONS

Andrews et al, "Special Edition Using Window 98, Second Edition", year 2000, Chapter 33, pp. 1-9.*

USPTO office action for U.S. Appl. No. 11/257,451 dated Sep. 18, 2009.

USPTO final office action for U.S. Appl. No. 11/257,451 dated Apr. 16, 2009.

USPTO office action for U.S. Appl. No. 11/257,451 dated Sep. 26, 2008.

USPTO final office action for U.S. Appl. No. 11/257,452 dated May 1, 2009.

USPTO office action for U.S. Appl. No. 11/257,452 dated Oct. 2, 2008.

USPTO office action for U.S. Appl. No. 11/257,452 dated Jun. 22, 2010.

USPTO Notice of Allowance for U.S. Appl. No. 11/257,451 dated Jul. 20, 2010.

Office Action dated Sep. 18, 2009 regarding U.S. Appl. No. 11/257,452, 9 pages.

* cited by examiner

CONTROL OPTIONS FOR INSTANT MESSAGE DISPLAY AND NOTIFICATION

CROSS-REFERENCE TO RELATED APPLICATION

The present invention is related to the subject matter of U.S. patent application Ser. No. 11/257,452, incorporated herein by reference.

FIELD OF THE INVENTION

The present invention is related generally to demand-based messaging systems, and in particular to graphical user interfaces for controlling chat sessions in an instant messaging application.

BACKGROUND OF THE INVENTION

Demand-based messaging is a communication service that allows people to exchange message data, such as text, over a network or other communications media, in real time. Probably the most common medium for exchange is the Internet, but as wireless phone networks continue to expand, their popularity for text messaging is also expanding. U.S. Pat. No. 6,301,609 issued to Aravamudun et al., and U.S. Patent Publications Nos. 2002/0035605 and 2004/0254998, for example, illustrate the move toward an exchange medium that unifies traditional and wireless communications. Instant messaging (IM) is perhaps the most widely known and used embodiment of demand-based messaging. Today, most network and online service providers offer some form of IM service. According to some estimates, the top three instant messaging service providers serve over forty million users. Instant messaging services also are being rapidly deployed and integrated into enterprise infrastructure. International Business Machines, Inc. (IBM), for example, has deployed LOTUS SAMETIME instant messaging applications for employees world-wide. Other examples of IM applications that are popular today include MSN Messenger and Yahoo/AOL Instant Messenger.

IM users typically use a networked computer and an IM client program to exchange messages with one another in conversational style. An IM client provides an interface for users to compose, send, receive, and read messages. In a graphical display, an IM client usually includes at least two windows: a window for composing and sending messages, and a window for displaying messages as users take turns sending and receiving them. IM sessions (colloquially referred to as "chats") are often lengthy, with multiple participants each taking many turns "speaking" in the chat window. Generally, a user initiates a chat by sending a chat request to a second IM user (or group of IM users). The request may also include the first message from the user. The chat is "open" after the second IM user accepts the request or otherwise responds to it, and typically remains open until one user affirmatively closes the chat. It is common for one user to have multiple IM chats open simultaneously, usually in separate windows.

Figure 1:
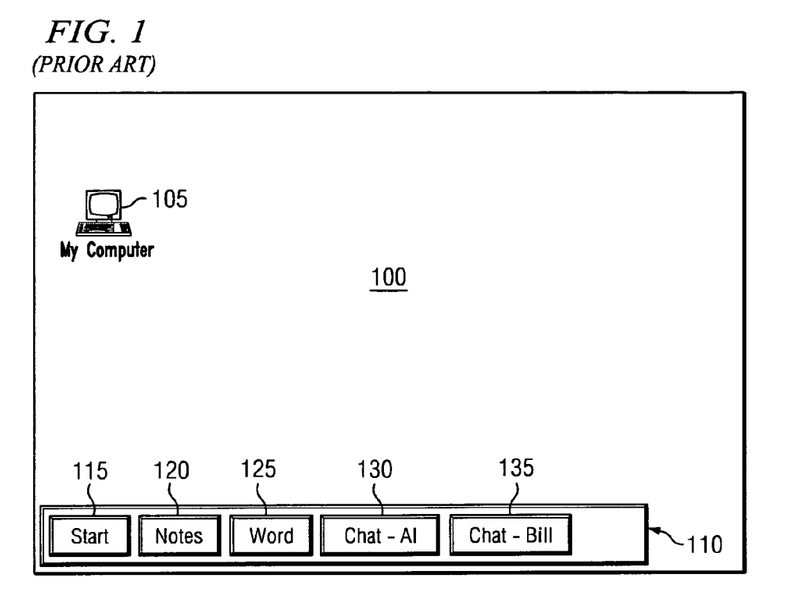
FIG. 1 illustrates an exemplary prior art graphical display having two minimized chat windows.

In many of today's graphical operating systems, including the MICROSOFT WINDOWS family of operating systems, windows can be "minimized" as needed to organize the information on a given display. As that term is used popularly, a window is "minimized" when it is reduced to an icon so that it uses only a small portion of the display. Typically, icons representing minimized windows are grouped together and placed along the edge of a screen in a graphical element commonly referred to as a "task bar." Of course, not much information about a window is visible when the window is minimized. When a chat window is minimized, for example, a user will generally see only a short title and, perhaps, a sender's name. FIG. 1 illustrates an exemplary graphical display 100 with icon 105, task bar 110, command button 115, minimized application windows 120-125, minimized chat window 130, and minimized chat window 135. Note that in FIG. 1, minimized chat windows 130 and 135 display the sender's names ("Al" and "Bill", respectively).

Figure 2:
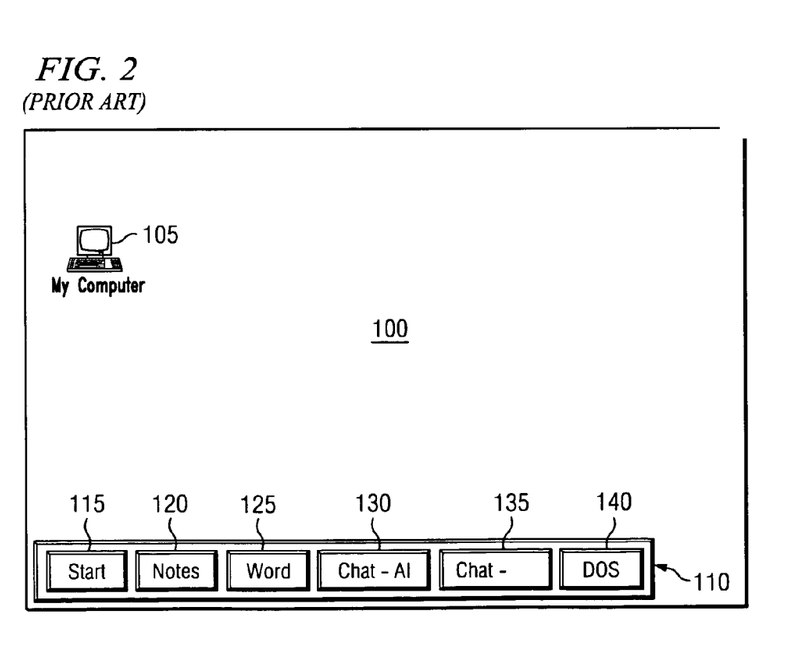
FIG. 2 illustrates an exemplary prior art graphical display having two compressed minimized chat windows.

As the number of windows in a graphical display increases, the operating system typically decreases the size of icons in the task bar and the length of the text displayed in each icon. Thus, as FIG. 2 illustrates, even a sender's name may not be completely visible in a minimized chat window and it becomes difficult for a user to determine the nature of the chat without constantly restoring the chat window to its full size. In FIG. 2, minimized application window 140 has been added to task bar 110, and minimized chat windows 130 and 135 have been compressed to make room for the new icon. Note that the sender's name is no longer visible in minimized chat window 135.

Figure 3:
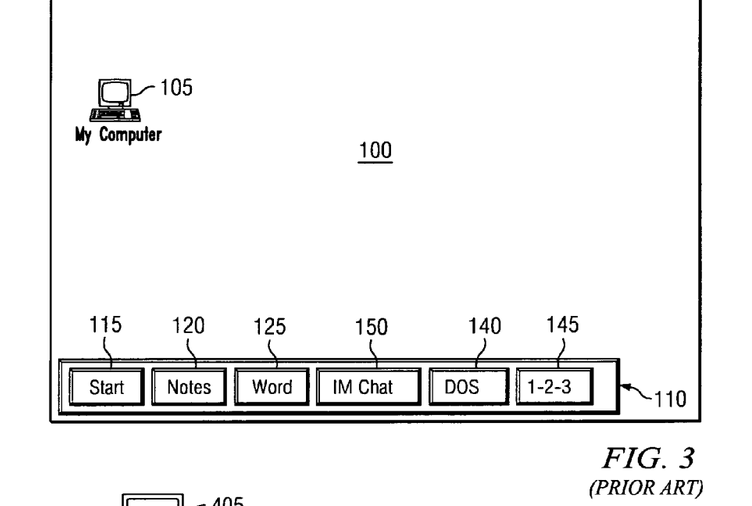
FIG. 3 illustrates an exemplary prior art graphical display having a minimized group window of chats.

Moreover, the operating system may compress all chat windows into a single icon in the task bar if there are too many icons to display at once. If all chat windows are so compressed, all identifying attributes of the various chats are lost to the user. FIG. 3 illustrates this scenario, in which minimized application window 145 has been added to task bar 110. Because there is no longer room to display all minimized windows in the task bar, the operating system has compressed minimized chat windows 130 and 135 into a single, new minimized group window 150. As FIG. 3 illustrates, minimized group window 150 does not display any chat-specific information.

Some conventional IM clients also include limited means for notifying a user when a user receives a new message or the chat is otherwise "active." An "active" chat, as that term is used here, is an open chat in which at least one message has been transmitted since the user last viewed the chat window. Common techniques include causing the window (minimized or not) to blink. Such techniques, though, do little to focus attention to a specific chat when multiple chat windows are compressed into a single minimized group. U.S. Pat. No. 6,907,447 (issued Jun. 14, 2005) addresses this shortcoming to some extent, disclosing a "Method and Apparatus for Providing an Instant Message Notification" that provides a sender's identification and the message topic in a separate window that "pops up" when a user receives a new message.

Either the operating system or the IM client also may display information about a given chat when a user "hovers" a pointer or cursor over a minimized chat window. In this context, the term "hover" refers to placing the pointer over the minimized window and leaving the pointer in such a position for a period of time determined by the operating system or the IM client. The time period typically is only a second or two. Generally, the operating system or IM client displays information such as the user's name and the application's name, usually in a pop-up window or "cloud" element.

Currently, though, no IM client provides an interface that allows a user to control display and notification options for individual chats. Consequently, all chat windows behave according to a single configuration. For example, some conventional IM clients allow the user to configure the client window to pop-up when a new message is received. In such a configuration, all open chats pop-up when any single chat receives a message. Accordingly, there is a need in the art for an improved user interface for IM clients that enables a user to configure display and notification options for individual chats.

SUMMARY OF THE INVENTION

The invention described in detail below is an improved method, product, and apparatus for configuring an instant messaging program in a computer having a display, an input device, and more than one open chat session, the method comprising: receiving a chat selection input signal from the input device indicating the selection of a chat session; displaying selectable chat configuration parameters on the display; receiving a configuration input signal from the selection device indicating the selection of a chat configuration parameter; and linking the selected chat configuration parameter to the selected chat session so that the selected chat configuration parameter controls the subsequent display of the selected chat session.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "chat control" program.

Figures 4, 5:
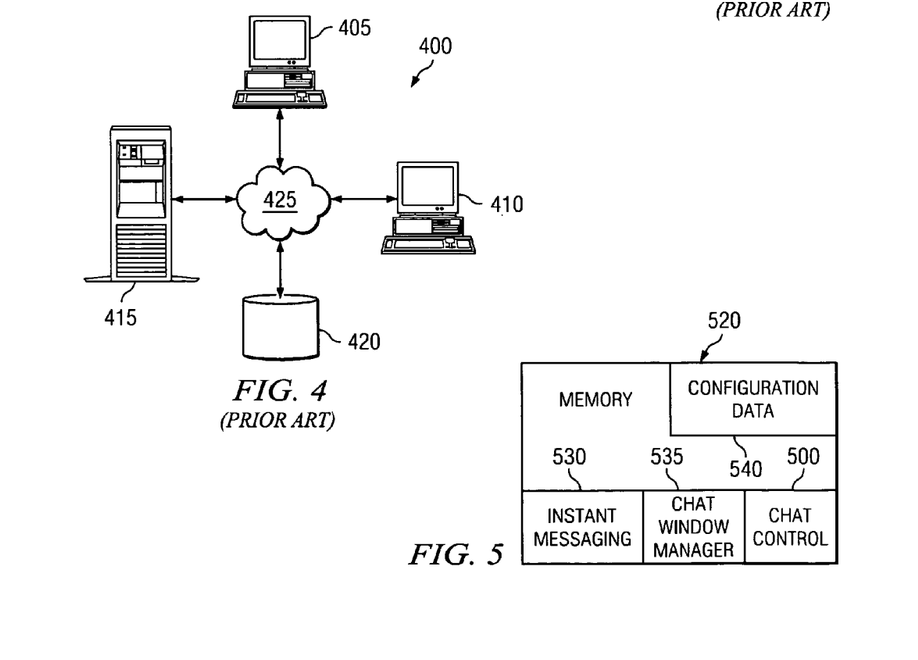
FIG. 4 illustrates an exemplary network of hardware devices in which the present invention can be practiced.
FIG. 5 is a schematic of a memory having components of the present invention stored therein.

Additionally, the chat control program is described below with reference to an exemplary network of hardware devices, as depicted in FIG. 4. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 400 has only a limited number of nodes, including workstation computer 405, workstation computer 410, server computer 415, and persistent storage 420. Network connection 425 comprises all hardware, software, and communications media necessary to enable communication between network nodes 405-420. Unless otherwise indicated in context below, all network nodes use publicly available protocols or messaging services to communicate with each other through network connection 425.

Chat control 500 typically is stored in a memory, represented schematically as memory 520 in FIG. 5. The term "memory," as used herein, includes without limitation any storage device, such as an electrical circuit, magnetic disk, or optical disk, in which a computer can store data or software for any duration. A single memory may encompass and be distributed across a plurality of storage devices and network nodes. Thus, FIG. 5 is included merely as a descriptive expedient and does not necessarily reflect any particular physical embodiment of memory 520. As depicted in FIG. 5, though, memory 520 may include additional data and programs. Of particular importance to chat control 500, memory 520 may include instant messaging (IM) program 530, chat window manager 535, and configuration data 540, with which chat control 500 interacts. IM program 530 represents any demand-based messaging software that provides an interface through which a user can access a messaging service and exchange messages with other users. Configuration data 540 represents any data source (including without limitation a file, table, or database) that identifies one or more of a user's preferences for displaying or filtering information about a chat window. In practice, chat control 500 may be integrated with IM program 530, but also may exist independently as an add-on module. The term "computer-readable storage device" does not mean a signal propagation media such as a copper transmission cable, an optical transmission fiber or a wireless transmission media.

In a preferred embodiment, chat window manager 535 also includes a graphical user interface (GUI), through which a user can interact with and control the program. The design and operation of a GUI is well-known in the art and need not be described in detail herein, but in general a GUI typically includes a display and a selection device. Common selection devices include mice, trackballs, touch pads, touch screens, and the like. An operating system or other program having a GUI draws graphical elements on the display. The graphical elements generally include windows, command buttons, and text boxes. A pointer or cursor also is usually drawn on the display to indicate the position of the selection device with respect to the display. To control a computer through a GUI, a user typically moves the selection device until the pointer is in a desired position, and then presses a button on the device (or simply touches the pad or screen). The device then sends a signal to the processor, indicating the position of the pointer and the user's action (i.e. which button the user pressed and how many times). The processor then responds to the signal according to the computer program associated with pointer position.

Chat window manager 535 organizes chat windows independent of the operating system's control. In particular, chat window manager 535 manages chat windows independent of a system's task bar. Chat window manager 535 may place a chat window in a system's task bar to present the user with a conventional view, but chat window manager 535 also gives the user additional options for configuring the display. These options, and the significant advantages that they offer, are described in more detail below.

Chat window manager 535 includes several user interface features for controlling the behavior of chat windows, including a control window. In one embodiment, the control window is an independent IM task bar control that can be detached from an operating system's task bar. Alternatively, the control window may be integrated into an existing icon in the operating system task bar. The control window allows a user to customize the behavior of chat window, detach the control window from a taskbar, resize the control window, and select display attributes such as font, text size, and color. The user can also configure the control window to always stay on top of other windows on the display.

Figure 6A:
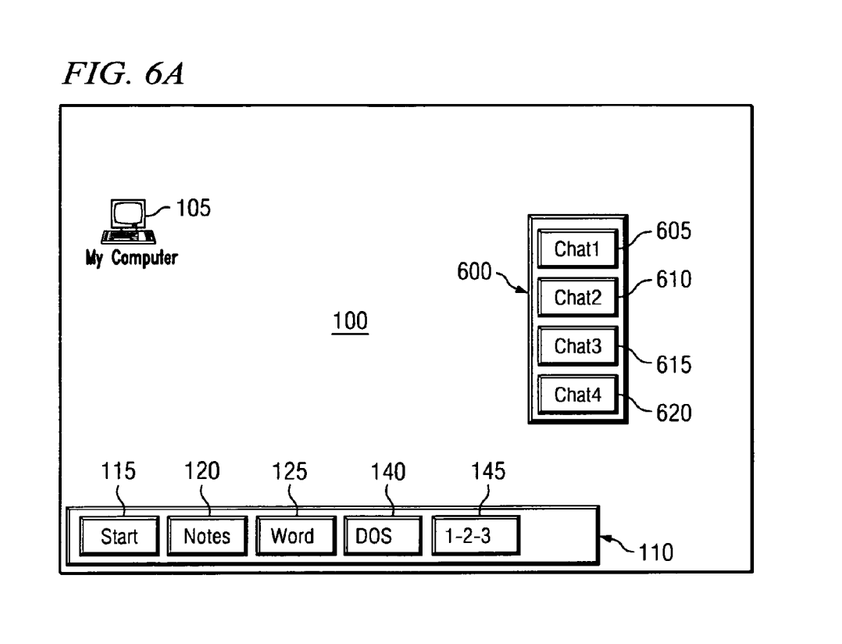
FIG. 6A illustrates an exemplary control window detached from the operating system task bar.
Figure 6B:
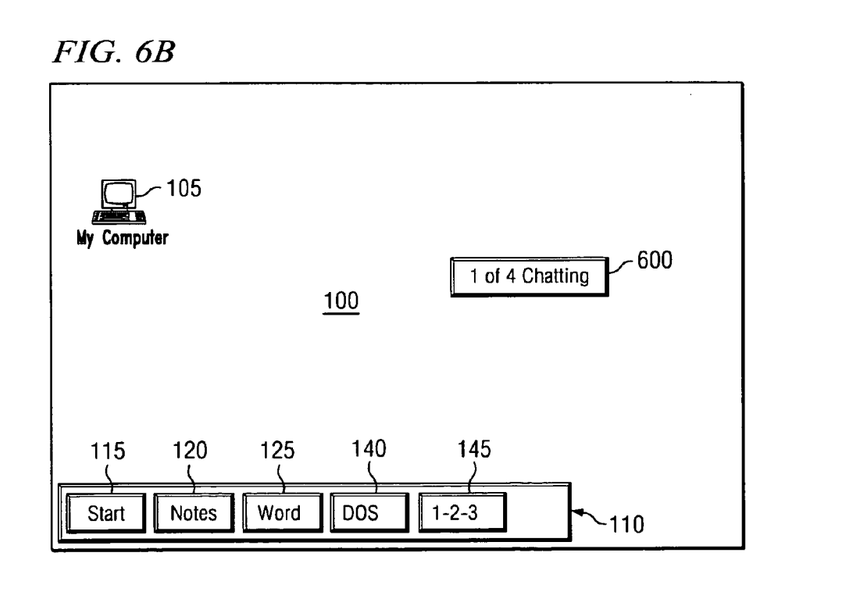
FIG. 6B illustrates an exemplary minimized control window detached from the operating system task bar.

Once detached, the control window may be moved to any part of the user's display. FIG. 6A illustrates exemplary control window 600 detached from the operating system task bar 110, in which four chats are open. Each graphical subdivision (referred to herein as "slots" 605-620) in control window 600 represents an open chat. This exemplary embodiment illustrates that only one detached control window 600 is needed, instead of multiple minimized chat windows in task bar 110, as seen in FIGS. 1 and 2. Control window 600 also may be minimized, as seen in FIG. 6B. In one embodiment, chat window manager 535 displays the number of chats that are open and how many are active if control window 600 is minimized. This feature also is illustrated in FIG. 6B, represented by the text "1 of 4 chatting" in minimized control window 600. A user may restore minimized control window 600 to its maximized state by clicking it or by hovering a pointer over it for a given time. Alternatively or additionally, chat window manager 500 may restore minimized control window 600 if a new message is received or a new chat session opened.

Figure 7A:
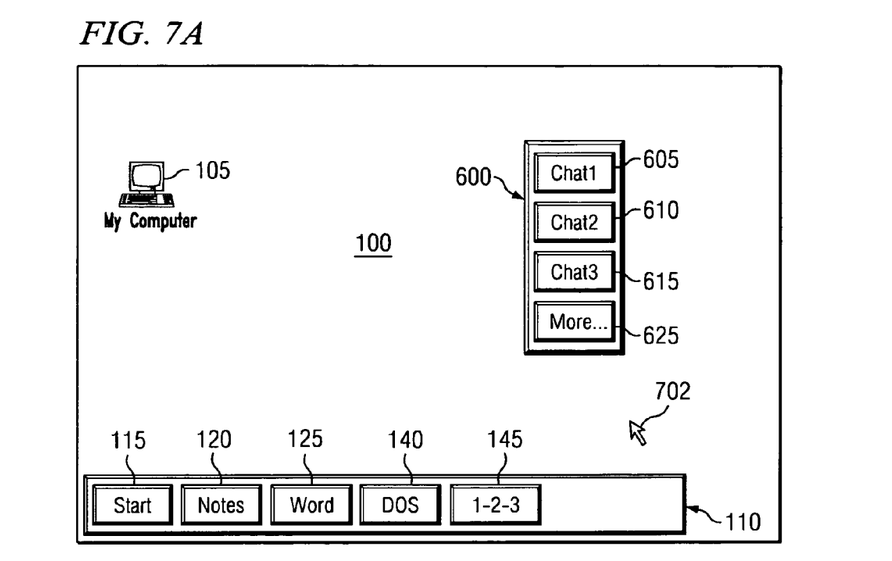
FIG. 7A illustrates an exemplary compressed control window.
Figure 7B:
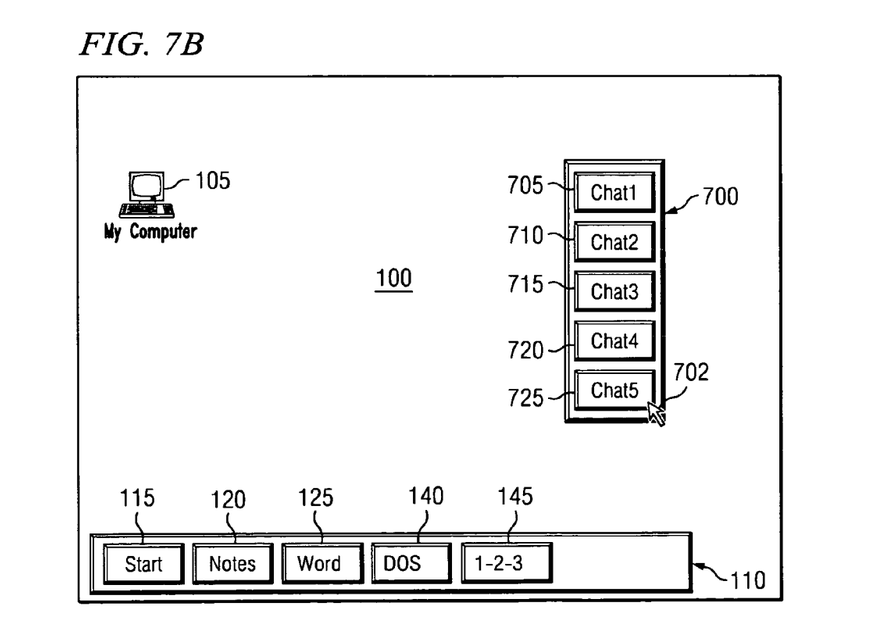
FIG. 7B illustrates an exemplary compressed control window with a pop-up list of chats.

Chat window manager 535 also can compress chat information in control window 600 if the size of control window is insufficient to display all information. In FIG. 7A, for example, a fifth chat is open but neither the user nor chat window manager 535 has enlarged the window to accommodate the additional information. As a result, not all information can be displayed and slot 620 is replaced by slot 625, indicating that more chats are open. As shown in FIG. 7B, though, chat window manager 535 creates pop-up list 700 having slots 705-725 (representing all five chats) if a user places a pointer, such as pointer 702, over compressed control window 600. If compressed control window 600 were located along the left or right edge of the display, then pop-up list 700 would be displayed to the right or left of compressed control window 600, respectively. Likewise, pop-up list 700 would be displayed above or below compressed control window 600 if compressed control window 600 were located along the bottom or top edge of the display, respectively.

Figure 8:
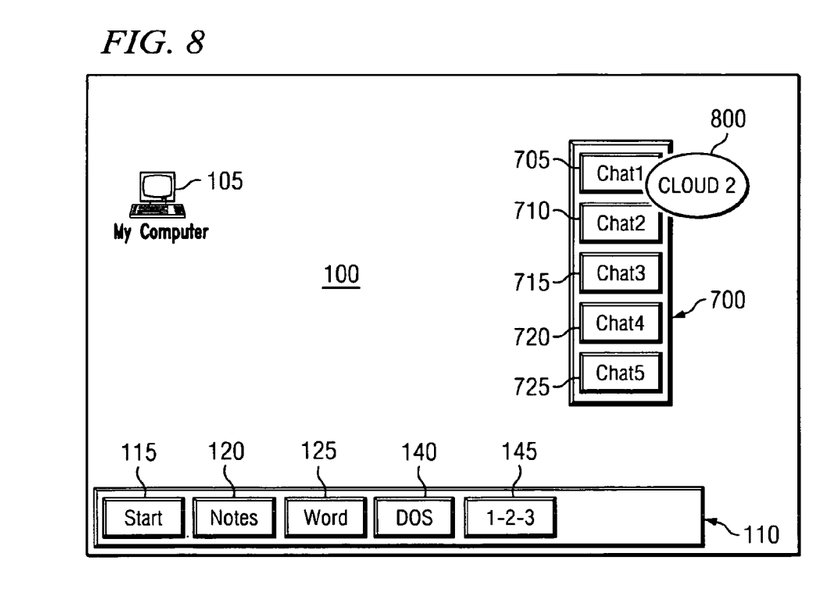
FIG. 8 illustrates the effects of selecting a slot in a control window.

From open control window 600 or from pop-up list 700, a user can select a particular chat slot to obtain additional information about the particular chat. Various means for selecting a slot are contemplated, but placing a pointer over the entry and hovering for a given time or clicking a button on the pointing device are preferred means. After a user selects a particular chat slot, chat window manager 535 displays descriptive chat data in a separate pop-up window or "cloud," which FIG. 8 illustrates as cloud 800. Alternatively or additionally, a user may select a particular chat slot to have chat window manager 535 open the particular chat in a chat window.

As described above, chat window manager 535 manages the creation and placement of various windows in an IM application and may display information about open instant messaging sessions in those windows. Chat control 500 augments chat window manager 535 and provides controls for the user to configure the operation of chat window manager 535. The same principles, though, are equally applicable to IM applications not operating with chat window manager 535. Configuration data 540 includes one or more chat configuration parameters that control the display and notifications of IM program 530 or chat window manager 535. Chat control 500 enables a user to link chat configuration parameters to specific chats, and also provides a GUI through which a user can set the links. In one embodiment of chat control 500, a user activates the GUI by selecting a designated menu item in a pop-up menu over an individual chat window, whether that individual chat window is represented as an icon in the task bar, a slot in control window 600, or any other form. A user also can set the duration of each chat configuration parameter, so that the effects on the display and notification are temporary (such as for one session) or permanent. Exemplary modes of operation are described below to illustrate the configuration principles of chat control 500.

In one mode of operation, a chat configuration parameter determines the appearance of information in a selected chat, such as the font or font effects of a user's message. For example, the user may set the chat configuration parameter so that user's message text is italicized. The chat configuration parameter set by chat control 500 would override any global formatting controlled by IM program 530 or chat window manager 535.

In another mode of operation, a chat configuration parameter controls the notifications that chat window manager 535 displays when a new message is received in a selected chat. For example, a user may set the chat configuration parameter so that the chat window pops up and is placed in the foreground every time a new message is received in the selected chat. Alternatively, a user may set the chat configuration parameter so that no action is taken, effectively ignoring messages in a selected chat.

Similarly, a user can set a chat configuration parameter to establish a time limit for a selected chat. In this mode, chat control 500 signals IM program 530 or chat window manager 535 to close the selected chat if there is no activity within the established time limit.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for configuring an instant messaging program, the method comprising:
based on responses to invitations to chat, a computer identifying a plurality of chat sessions that are open;
the computer displaying a plurality of buttons in a first control window detached from an operating system task bar, wherein the plurality of buttons correspond to the plurality of chat sessions;
a computer receiving a selection of a first chat session of the plurality of chat sessions responsive to selection of a first button of the plurality of buttons, the first button corresponding to the first chat session;
responsive to user input for configuring a manner in which the first chat session displays text messages, the computer determining a setting for the manner of displaying text messages of the first chat session and a finite duration of time for using the setting to override another, more global setting for the manner of displaying the text messages of the first chat session and other chat sessions, wherein the determined setting is a time limit for identifying whether to close the first chat session if no activity occurs for the first session within the time limit;
the computer determining a duration that the first chat session remains open without activity; and
responsive to receipt of a request, during the duration of time, to implement the other global setting, the computer not implementing the other global setting and instead, maintaining the determined setting.

2. The method of claim 1, wherein the determined setting and the other more global setting are font settings, and further comprising:
the computer using the determined font setting to display a first text message in the first chat session based on a determination, by the computer, that the first text message was received during the duration of time for using the determined font setting; and
the computer using the other more global font setting to display a second text message in the first chat session based on a determination, by the computer, that the second text message was not received during the duration of time for using the determined font setting.

3. The method of claim 1, wherein the determined setting is a window setting of the first chat session for identifying whether to place the window on top of other windows on receipt of text messages for the first chat session, and further comprising:
responsive to the window setting is to place the window on top of the other windows on receipt of text messages, the computer using the window setting to place the window of the first chat session on top of the other windows based on a determination, by the computer, that a first text message was received during the duration of time for using the window setting, and the computer not using the window setting to place the window of the first chat session on top of the other windows based on a determination, by the computer, that a second text message was not received during the duration of time for using the window setting; and
responsive to the window setting is to not place the window on top of other windows on receipt of text messages, the computer using the window setting to not place the window of the first chat session on top of the other windows when displaying received text messages in the window of the first chat session during the duration of time for using the window setting.

4. A computer system, comprising:
one or more processors, one or more computer-readable memories, one or more computer-readable, storage devices, and program instructions stored on the one or more storage devices for execution by the one or more processors via the one or more memories, the program instructions comprising:
program instructions to identify a plurality of chat sessions that are open based on responses to invitations to chat;
program instructions to display a plurality of buttons in a first control window detached from an operating system task bar, wherein the plurality of buttons correspond to the plurality of chat sessions;
program instructions to receive a selection of a first chat session of the plurality of chat sessions responsive to selection of a first button of the plurality of buttons, the first button corresponding to the first chat session;
program instructions, responsive to user input for configuring a manner in which the first chat session displays text messages, to determine a setting for the manner of displaying the text messages of the first chat session and a finite duration of time for using the setting to override another, more global setting for the manner of displaying the text messages of the first chat session and other chat sessions, wherein the determined setting is a time limit for identifying whether to close the first chat session if no activity occurs for the first session within the time limit;
program instructions to determine a duration that the first chat session remains open without activity; and
program instructions, to not implement the other global setting and instead maintain the determined setting in response to receipt of a request, during the duration of time, to implement the other global setting.

5. A computer program product, comprising:
one or more computer-readable, storage devices and program instructions stored on the one or more storage devices, the program instructions comprising:
program instructions for identifying a plurality of chat sessions that are open based on responses to invitations to chat;
program instructions for displaying a plurality of buttons in a first control window detached from an operating system task bar, wherein the plurality of buttons correspond to the plurality of chat sessions;
program instructions for receiving a selection of a first chat session of the plurality of chat sessions responsive to selection of a first button of the plurality of buttons, the first button corresponding to the first chat session;
program instructions, responsive to user input for configuring a manner in which the first chat session displays text messages, for determining a setting for the manner of displaying text messages of the first chat session and a finite duration of time for using the setting to override another, more global setting for the manner of displaying the text messages of the first chat session and other chat sessions, wherein the determined setting is a time limit for identifying whether to close the first chat session if no activity occurs for the first session within the time limit;
program instructions for determining a duration that the first chat session remains open without activity; and program instructions, for not implementing the other global setting and instead maintaining the determined setting in response to receipt of a request, during the duration of time, to implement the other global setting.

* * * * *